United States Patent [19]

Roe

[11] Patent Number: 5,106,599

[45] Date of Patent: Apr. 21, 1992

[54] ALUMINA CRYSTAL GROWTH ADDITIVE

[75] Inventor: William J. Roe, Roswell, Ga.

[73] Assignee: Nalco Chemical Company, Naperville, Ill.

[21] Appl. No.: 475,622

[22] Filed: Feb. 6, 1990

[51] Int. Cl.$^5$ .......................... C01F 7/00; C01F 7/02; C01F 7/06

[52] U.S. Cl. .................................. 423/122; 423/130; 423/266; 423/629; 423/630; 23/300; 23/305 A

[58] Field of Search ............... 423/629, 111, 630, 119, 423/625, 130, 266, 122, 265, 121; 210/714, 731; 23/305 A, 300, 301; 502/507

[56] References Cited

U.S. PATENT DOCUMENTS

| | | | |
|---|---|---|---|
| 2,345,139 | 3/1944 | Lindsay et al. | 423/265 |
| 2,734,796 | 2/1956 | Ashley et al. | 423/265 |
| 3,085,853 | 4/1963 | Lesinski et al. | 423/131 |
| 3,142,637 | 7/1964 | Cook | 210/731 |
| 3,197,289 | 7/1965 | Rogers | 23/300 |
| 3,390,959 | 7/1968 | Sibert | 423/122 |
| 3,445,187 | 5/1969 | Sibert | 423/111 |
| 3,826,755 | 7/1974 | Grimes et al. | 252/62.57 |
| 3,937,748 | 2/1976 | Miklas | 585/541 |
| 4,201,749 | 5/1980 | Yamada et al. | 23/301 |
| 4,263,261 | 4/1981 | Yamada et al. | 23/301 |
| 4,608,237 | 8/1986 | Roe et al. | 423/130 |
| 4,678,585 | 7/1987 | Brownrigg | 210/727 |
| 4,737,352 | 4/1988 | Owen et al. | 423/122 |
| 4,822,593 | 4/1989 | Wilhelmy | 423/629 |
| 4,839,060 | 6/1989 | Yong et al. | 423/111 |
| 5,008,089 | 4/1991 | Moody et al. | 423/121 |

FOREIGN PATENT DOCUMENTS 367437  5/1990  European Pat. Off. .

OTHER PUBLICATIONS

Grant, R.; Grant, C.; eds. "Grant and Hackh's Chemical Dictionary", 5th ed. McGraw-Hill: New York (1987), p. 37.

Ivekovi , H.; Vrabaski, T.; Pavlovi , "The Precipitation of Alumina Hydrate from Aluminate Solutions in the Presence of Some Higher Alcohols and Starch". Croatica Chemica Acta, vol. 28 (1956) pp. 101–105.

Sato, T. "Studies on the Hydrolysis of Sodium Aluminate Solutions. XVII. Effect of the Addition of Some Carbohydrates on the Particles Precipitated by the Decomposition of Sodium Aluminate Solutions with Seeding." Journal of Applied Chemistry, vol. 9 (1959), p. 50.

Sato, T. "Studies on the Hydrolysis of Sodium Aluminate Solutions. XVIII. The Effect of the Presence of the Starch of the Decomposition of Sodium Aluminate Solutions with Seeding." Journal of Applied Chemistry (London), vol. 9 (1959) pp. 172–175.

Sato, T. "Studies on the Hydrolysis of Sodium Aluminate Solutions, XIX. X-Ray Diffraction Studies of the Crystals Precipitated by Seeded Decomposition of Sodium Aluminate Solution in the Presence of Some Carbohydrates" Journal of Applied Chem., vol. 10 (1960), pp. 35–38.

Pharmachem Corporation Technical Disclosure Bulletin-Dextrans, pp. 1–21.

*Primary Examiner*—Michael Lewis
*Assistant Examiner*—Peter DiMauro
*Attorney, Agent, or Firm*—Donald G. Epple; Robert A. Miller

[57] ABSTRACT

A method of modifying crystal structure of alumina trihydrate crystallizing from saturated Bayer liquors, which method includes the treatment of the saturated Bayer liquors with a crystal modifying amount of a polysaccharide, preferably a dextran.

9 Claims, 2 Drawing Sheets

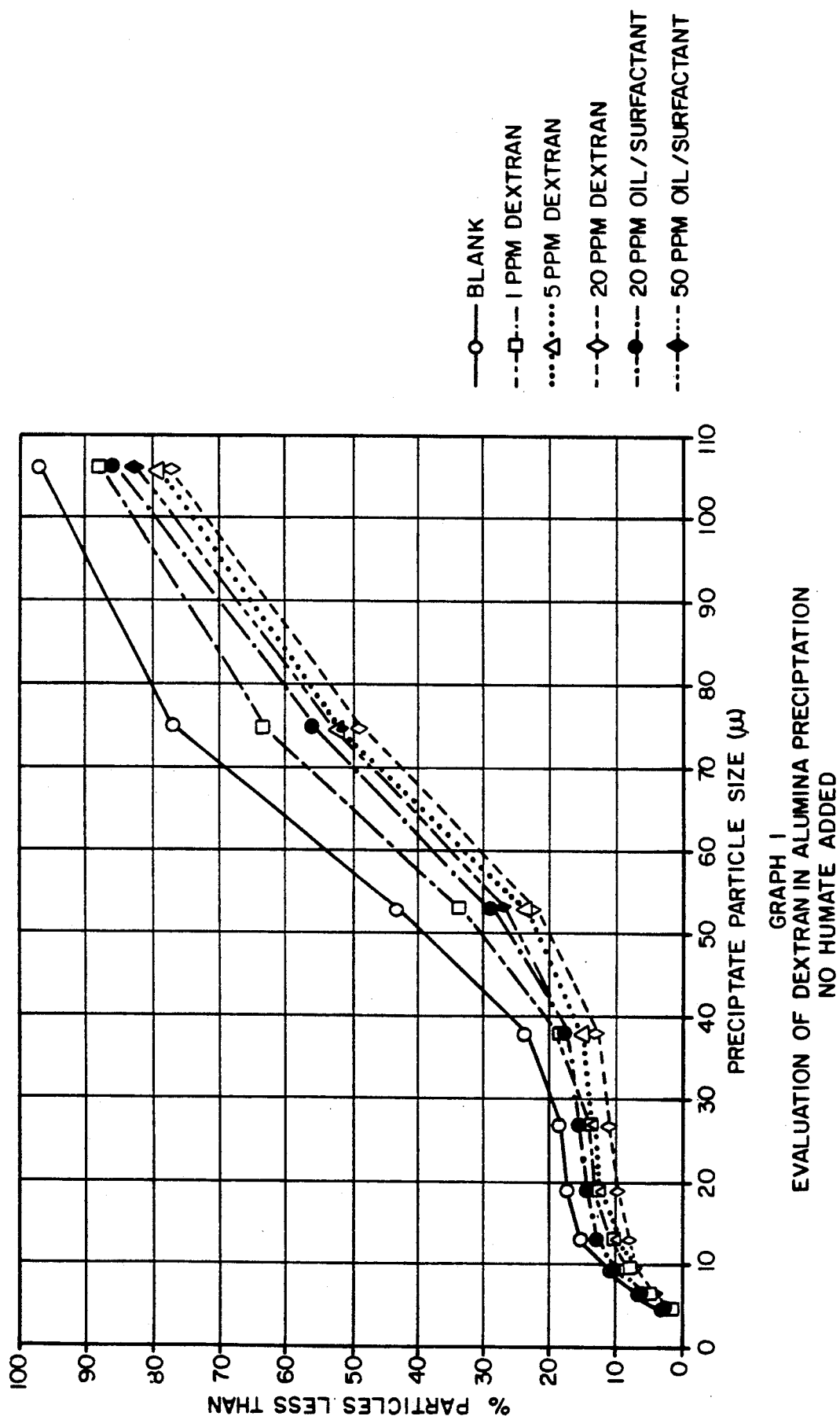

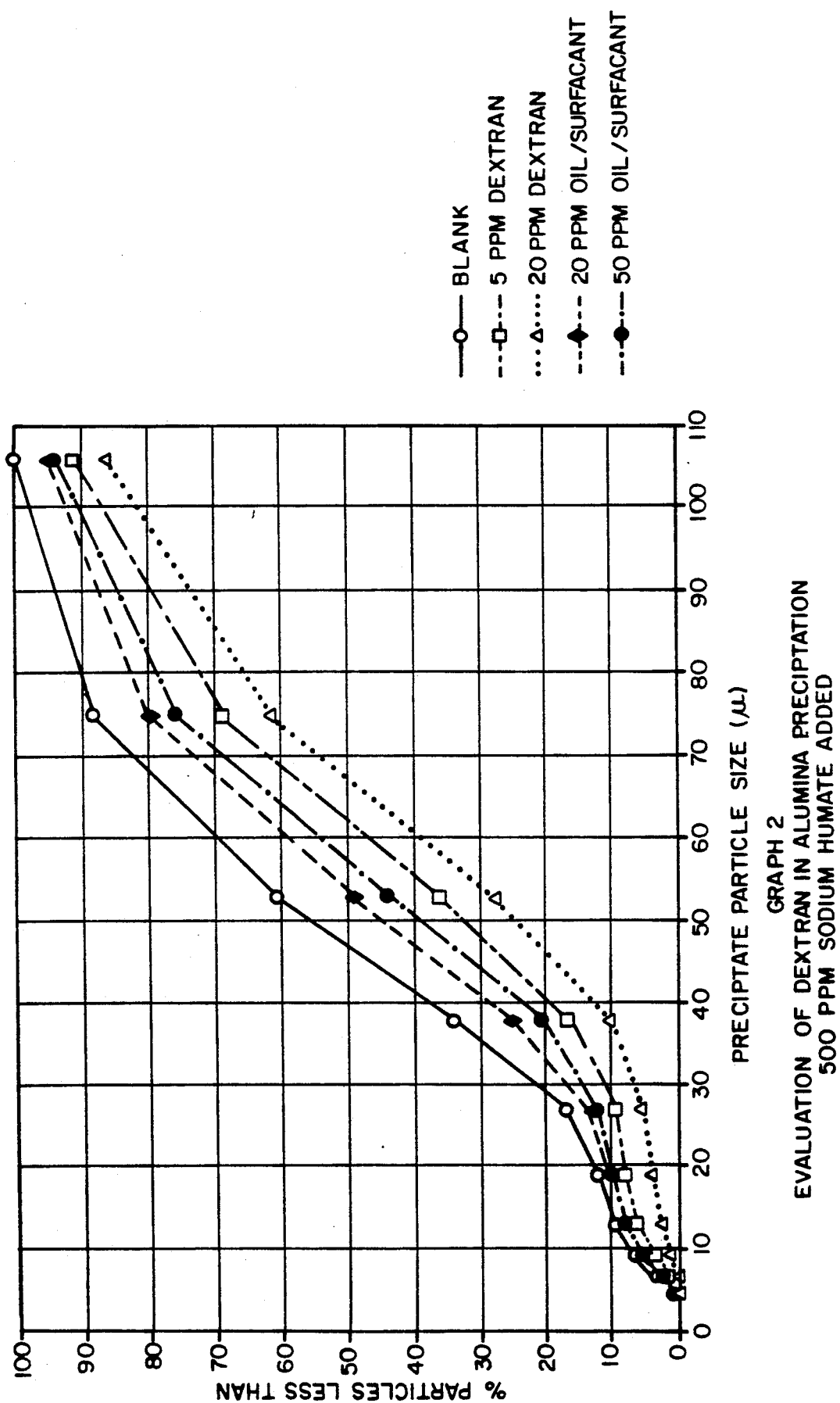

ALUMINA CRYSTAL GROWTH ADDITIVE

INTRODUCTION

This invention is concerned with treatment of Bayer process pregnant liquor, sometimes referred to as Bayer process green liquor, from which aluminum values are precipitated as alumina trihydrates.

In the Bayer process for bauxite ore beneficiation, crystallization and precipitation of solubilized alumina trihydrate values from causticized sodium aluminate liquors, referred to herein as Bayer process liquor, is a critical step toward the economic recovery of aluminum values. Bayer process operators optimize their precipitation method so as to produce the greatest possible yield from the Bayer process liquors, while trying to achieve a given crystal size or crystal size distribution. It is desirable in most instances to obtain relatively large crystal sizes since this is beneficial in subsequent processing steps required to produce alumina, alumina products, and/or aluminum metals. Production is often limited by processing conditions under which the crystallization and precipitation steps are conducted. These processing conditions vary from one plant to the next and include, but are not limited to, temperature profiles, seed charge, seed crystal surface area, liquor loading, liquor purity, and the like. My invention appears to function to achieve increased average crystal size irrespective of the various processing conditions which may be present.

It is extremely well known that organic impurities in the Bayer process liquors, which impurities are normally derived from organics present in the bauxite ore or derived therefrom, can have devastating effects on Bayer process crystallization practises. These organics can include humate chemicals or humate-derived chemicals such as sodium oxalate and the like.

It would, therefore, be an advance in the art if technology could be developed to enhance the crystallization process even in the presence of humates, oxalates, and other impurities.

This has been accomplished with the instant invention. The instant invention involves the addition of certain additives prior to or simultaneously with the addition of seed crystals to enhance the production of alumina trihydrate precipitates from pregnant Bayer process liquors. The instant invention has been found to work even in the presence of certain impurities such as humates and oxalates, and the practise of the invention leads to the formation of higher particle size alumina trihydrate crystals. This phenomenon is observed irrespective of the operating plant criteria in regards to Bayer liquor quality, loading, purities, temperature of operation, time for recovering alumina trihydrate crystallites, seeding media and/or concentration and/or particle size, and the like. The instant invention also avoids the addition of insoluble hydrocarbons, an addition which is made in a commercially important technique currently practised to achieve alumina trihydrate crystal growth in the Bayer process.

PRIOR PRACTISES

A number of techniques have been demonstrated in the art and in prior publications and patents to achieve similar phenomenon achieved by the practise of the instant invention. For example, Owen et al., U.S. Pat. No. 4,737,352, have demonstrated a method and composition for producing coarse alumina trihydrate crystal in the Bayer process pregnant liquor by adding thereto an oil in which is dissolved certain surfactants. This adds hydrocarbons to the precipitated alumina trihydrate.

Roe et al., U.S. Pat. No. 4,608,237, add polyacrylic acid having a molecular weight in excess of one million and containing at least fifty mole percent acrylic acid monomer to pregnant Bayer process liquors to control the negative effects of sodium oxalate on the crystallization of alumina trihydrate from the Bayer process liquors. This technique is not commercially competitive with the Owen et al. process above.

Keeney, U.S. Pat. No. 4,472,280, teaches a method of removing certain anionic polymers and acidic organic impurities from aqueous trona solutions prior to the crystallization of tronas, thereby improving crystal formation of the trona solution. The preferred polymers Keeney uses in his trona crystallization process are nitrogen-containing cationic polymers and the purpose is to eliminate contaminants thought to be interfering with crystallization of trona. Of course, trona is not alumina trihydrate. Each of the patents above, U.S. Pat. No. 4,737,352, U.S. Pat. No. 4,608,237, and U.S. Pat. No. 4,472,280, are incorporated herein by reference.

None of the above references teach or anticipate or make obvious the invention to be described below.

THE INVENTION

I have discovered an improved method of producing an improved, large crystalline sized, alumina trihydrate crystal by crystallization from a hot, caustic pregnant Bayer process liquor, which improved alumina trihydrate crystals have a reduced content of crystallites having a crystal size below $-325$ mesh; also reduced percentage of crystallites below 40 microns; and which improved method comprises treating the hot, caustic pregnant liquor, after red mud separation and after any final settling, centrifugation, or filtration step, if any such step is employed to remove suspended red mud residues from the pregnant liquor, but prior to or simultaneously with the seeding of the pregnant caustic Bayer process liquors, with an effective crystal-modifying amount of a linear polysaccharide having a degree of branching less than five weight percent of the total weight of the polysaccharide added. My method is preferably practised with a linear polysaccharide having a weight average molecular weight ranging between about 50,000 to about 40,000,000, which linear polysaccharide is added to the pregnant Bayer liquors in a concentration ranging between about 0.1 ppm to about 1000 ppm based on the total weight of the caustic pregnant Bayer process liquor being so treated.

THE LINEAR POLYSACCHARIDE

The linear polysaccharide useful in my invention can be any linear polysaccharide which has a degree of branching less than about five weight percent of the total weight of the polysaccharide. Preferably this polysaccharide is derived from hydrolyzed starches or from polymerized anhydroglucose-based units so that the polysaccharides have a weight average molecular weight ranging between about 50,000 to about 40,000,000. Preferably the weight average molecular weight that is useful in my invention ranges between about 100,000 to about 35,000,000, and most preferably ranges between about 500,000 to about 25,000,000. However, the linear polysaccharides which are useful in the invention can have molecular weight below 500,000 or above 25,000,000.

Branching of the anhydroglucose units can occur when these units are obtained from certain starches or other natural products and the branching is primarily that achieved through a 1,3 branching location on the anhydroglucose unit. The primary structure of the anhydroglucose units and the polysacchaide polymers useful in this invention is given by Formula I.

Dextrans can also be produced by the roasting of corn or potato starches and/or by the hydrolysis of corn starches or other starch materials to produce various fractions having different molecular weight characteristics, different branching characteristics, and the like, which fractions may be recovered from the reaction media either by alcohol precipitation or by other techniques such as temperature gradient precipitation.

The polysaccharides most useful in the instant inven-

FORMULA I

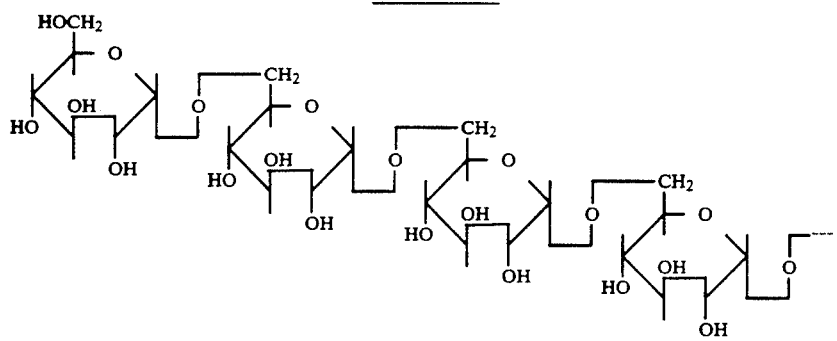

However, branching can exist, up to about five percent (5%), and can be illustrated by the structures in Formula II below.

tion are those which are essentially linear and consist of approximately 95 percent of $\alpha$ 1,6 linked glucopyranose units, but can include up to about five (5) percent $\alpha$ 1,3

FORMULA II

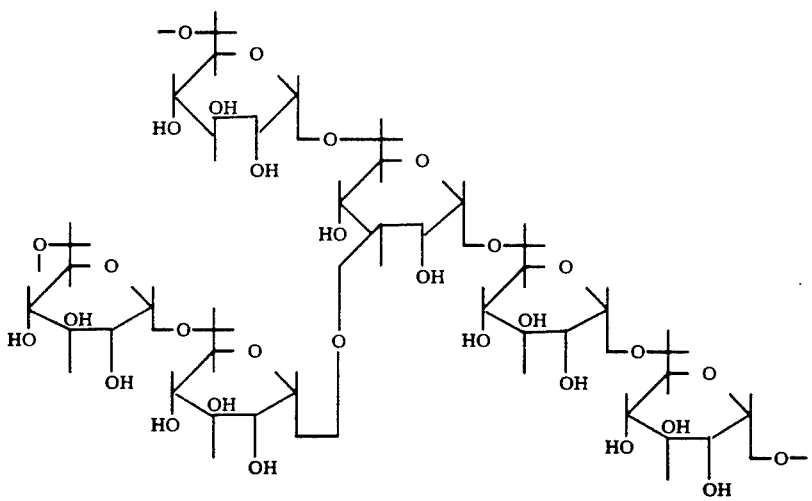

A primary source of the anhydroglucose polysaccharide units useful in this invention are from dextrans which have a preponderance of $\alpha$ 1-6 linked anhydroglucose units (sometimes referred to as anhydroglucopyranose units). As an example, the dextran products supplied by a company, Pharmachem, Inc., are useful in the instant invention. Pharmachem's products are derived from a native polymer produced by the bacterium *Leuconostoc mesenteroides*, strain NRRL B-512 F. This bacterium can be cultured on an industrial scale and used to induce the synthesis of an extra-cellular enzyme, dextransucrase, which in turn are mixed with sucrose sources and catalyse the transfer of the glucose moiety of the sucrose disaccharide raw material onto a growing polysaccharide polymer chain. The dextrans produced in this manner have wide ranges of molecular weights.

linked glucopyranose monomer units These side-chains are preferably usually no more than 1-2 glucose units in length. However, dextrans or other polysaccharides having slightly higher branching or increased side-chain length can still be useful in the invention. At very high molecular weights and high degree of branching these materials may be water insoluble, though still swellable.

The amount of dextrans or other polysaccharide materials added which effectively modifies crystal growth and crystal structure of the alumina trihydrates in the precipitation step of the Bayer process can be as little as 0.1 ppm, based on the total weight of the Bayer liquors being treated, and can be as high as 500-1000 ppm on the same basis. A preferred concentration range would be between about 0.5 ppm to about 200 ppm and a most preferred concentration range would be between about 1.0 ppm to about 50 ppm polysaccharide, based on the total weight of the Bayer liquor being treated. The polysaccharide can be added as a solution or a suspension, but is preferably added as a solution which contains at least 0.1 weight percent dissolved polysaccharide, preferably at least 0.5 weight percent dissolved polysaccharides. The solutions or suspensions used are preferably water solutions, preferably having a pH ranging between about 4.0 to about 12.0. The polysaccharide concentrations effective in modifying the crystals, which concentrations are listed above as from about 0.1 to about 1000 ppm, are based on active concentrations of what would be a solid, neat polysaccharide material, which material is preferably a dextran which may be added as a solution or suspension in neutral to basic pH water to the hot pregnant caustic Bayer liquors. Best performance is observed when the polysaccharides are dissolved in the hot pregnant liquors prior to cooling and precipitation.

The molecular weights above are weight average molecular weights which may be obtained from light-scattering data. These molecular weights may also be verified by viscosity measurements of the dextran solutions.

Dextran solutions have been used in the Bayer liquor process in the past. However, their use has been primarily as a flocculant aid such as in red mud settling and as a flocculant for alumina trihydrate after seeding and cooling of pregnant liquor and after alumina trihydrate crystallization. However, the instant invention has never been anticipated or taught in the prior use of dextrans as flocculation aids. Prior use of dextrans in the crystallization step have been to add the dextran materials after the seeding and crystallization step has begun and either nearly completed or totally completed. The dextrans in this flocculation use act merely as a flocculant, or flocculating agent, to separate and increase the rate of separation of the formed alumina trihydrate crystals from the spent Bayer liquor process. Use in this manner has no real affect on crystal size and does not show crystal modification as does the use of dextrans in the method of this invention.

To demonstrate my invention the following examples are provided:

EXAMPLES

Synthetic green liquor, (also referred to as pregnant Bayer liquors) saturated with alumina trihydrate values, is prepared in the laboratory by dissolving alumina trihydrate in hot caustic. Preferably the temperature of the hot caustic is between about 110° C. to about 120° C., with a preferred temperature ranging between about 112° C. to about 117° C. Our tests were performed at 115° C. After the alumina trihydrate is dissolved to a level equal to its saturation value at this temperature, any reagents to be tested and mixed into the solution are added and dissolved therein.

After the addition of the test reagents, an alumina trihydrate seed obtained from an operating Bayer process plant, is added in appropriate quantities and the resulting slurry is agitated and cooled to a temperature of about 65° C. in a period of approximately sixteen (16) to eighteen (18) hours, thereby precipitating the alumina trihydrate from the pregnant synthetic green liquor. Particle size distribution is determined on the precipitate recovered to determine the coarsening effect caused by the test reagents of this invention.

Table I and Graph I show that the addition of the linear polysaccharides of this invention in the precipitation stage, prior to seeding the pregnant synthetic green liquors, lowers the percent of alumina trihydrate precipitate having a particle size less than −325 mesh, corresponding to approximately a particle size less than 40 microns, relative to a blank precipitate obtained from the same synthetic green liquor absent any crystal modifying treatment. Also, the data presented demonstrates the fact that the linear polysaccharides, that is the dextrans, which are used in these experiments, provides an improved result over the results of an oil/surfactant formulation which would be covered by the claims of Owen et al., U.S. Pat. No. 4,737,352.

In a second set of experiments, 500 ppm of a sodium humate was added to the synthetic green pregnant liquor prior to the addition of the crystal-modifying linear polysaccharide reagents of this invention. This was an attempt to simulate process conditions where bauxite ores are digested which ores contain organic matter producing these kinds of humate impurities during the digestion step of the Bayer process. Table II and Graph II demonstrate the results obtained and again show that the addition of the linear polysaccharides of this invention give a coarser precipitate than that obtained with either no treatment or treatment with a product which would be covered by the Owen et al. patent, U.S. Pat. No. 4,737,352, which has been incorporated herein by reference.

Table III gives results obtained from a test run on an actual Bayer process plant pregnant green liquor. Once again, even in the presence of the naturally occurring impurities which included not only humate, but also oxalate salts, the dextran used according to the instant invention obtained a coarser alumina trihydrate precipitate than available with no treatment.

TABLE I

EVALUATION OF DEXTRAN IN ALUMINA PRECIPITATION
% PRECIPITATE LESS THAN A GIVEN PARTICLE SIZE
NO HUMATE ADDED

| SIZE ($\mu$) | BLANK | DEXTRAN (1 ppm) | DEXTRAN (5 ppm) | DEXTRAN (20 ppm) | OIL/ SURFACTANT* (20 ppm) | OIL/ SURFACTANT* (50 ppm) |
|---|---|---|---|---|---|---|
| 300.0 | 100.0 | 100.0 | 100.0 | 100.0 | 100.0 | 100.0 |
| 212.0 | 100.0 | 100.0 | 100.0 | 100.0 | 100.0 | 100.0 |
| 150.0 | 100.0 | 100.0 | 98.2 | 99.7 | 100.0 | 100.0 |
| 106.0 | 96.5 | 87.9 | 79.0 | 77.7 | 85.5 | 82.2 |
| 75.0 | 76.9 | 63.2 | 52.4 | 48.8 | 55.6 | 52.3 |
| 53.0 | 43.0 | 33.5 | 24.0 | 23.2 | 29.1 | 27.2 |
| 38.0 | 23.6 | 18.5 | 15.6 | 13.2 | 17.7 | 17.6 |
| 27.0 | 18.4 | 13.9 | 13.7 | 11.6 | 15.6 | 16.3 |
| 19.0 | 17.3 | 13.2 | 13.2 | 10.0 | 14.7 | 14.6 |
| 13.0 | 15.1 | 10.4 | 11.9 | 8.6 | 13.1 | 13.3 |
| 9.4 | 10.0 | 7.8 | 8.9 | 6.9 | 10.3 | 11.0 |

TABLE I-continued

EVALUATION OF DEXTRAN IN ALUMINA PRECIPITATION
% PRECIPITATE LESS THAN A GIVEN PARTICLE SIZE
NO HUMATE ADDED

| SIZE (μ) | BLANK | DEXTRAN (1 ppm) | DEXTRAN (5 ppm) | DEXTRAN (20 ppm) | OIL/ SURFACTANT* (20 ppm) | OIL/ SURFACTANT* (50 ppm) |
|---|---|---|---|---|---|---|
| 6.6 | 6.1 | 4.6 | 5.3 | 3.9 | 6.0 | 6.5 |
| 4.7 | 2.7 | 1.4 | 2.1 | 1.5 | 2.5 | 2.6 |

*As taught in Owen et al., U.S. Pat. No. 4,737,352

TABLE II

EVALUATION OF DEXTRAN IN ALUMINA PRECIPITATION % PRECIPITATE LESS THAN A GIVEN PARTICLE SIZE 500 PPM HUMATE ADDED

| SIZE (μ) | BLANK | DEXTRAN (5 ppm) | DEXTRAN (20 ppm) | OIL/ SURFACTANT* (20 ppm) | OIL/ SURFACTANT* (50 ppm) |
|---|---|---|---|---|---|
| 300.0 | 100.0 | 100.0 | 100.0 | 100.0 | 100.0 |
| 212.0 | 100.0 | 100.0 | 100.0 | 100.0 | 100.0 |
| 150.0 | 100.0 | 100.0 | 99.9 | 100.0 | 100.0 |
| 106.0 | 99.8 | 91.1 | 86.4 | 95.1 | 93.8 |
| 75.0 | 88.1 | 68.7 | 61.8 | 79.9 | 75.8 |
| 53.0 | 60.6 | 36.1 | 27.9 | 49.3 | 43.7 |
| 38.0 | 33.7 | 16.9 | 10.2 | 25.2 | 20.6 |
| 27.0 | 16.6 | 9.5 | 5.4 | 13.6 | 12.4 |
| 19.0 | 11.9 | 8.0 | 3.9 | 10.1 | 9.9 |
| 13.0 | 9.5 | 6.2 | 2.6 | 8.4 | 7.9 |
| 9.4 | 6.4 | 4.0 | 1.1 | 5.9 | 5.4 |
| 6.6 | 3.5 | 2.2 | 0.6 | 3.2 | 2.7 |
| 4.7 | 1.0 | 0.4 | 0.2 | 0.9 | 0.7 |

*As taught in Owen et al., U.S. Pat. No. 4,737,352

TABLE III

EVALUATION OF DEXTRAN IN ALUMINA PRECIPITATION IN PLANT LIQUOR

| Product | Dose (ppm) | Precipitate Size (% less than 106μ) |
|---|---|---|
| Blank | — | 55 |
| Oil/Surfactant* | 50 | 48 |
| Dextran | 5 | 49 |

*As taught in Owen et al., U.S. Pat. No. 4,737,352

BRIEF DESCRIPTION OF THE DRAWINGS

The figures I and II demonstrate the improved overall effect of dextrans relative to both measured particle size and number of particles (or crystals) having a particular size. Figure I is a humate free experiment, while Figure II is purposely contaminated with humate.

The dextrans used in the above experiments are materials identified as C-2P, manufactured by Pharmachem Corporation, and having a weight average molecular weight ranging between about 5,000,000 to about 40,000,000. These dextrans are manufactured by the procedures listed above using bacterial strains and raw sucrose, although other dextrans having the characteristics described above are also expected to function as crystal modifiers and crystal size enhancers.

It is important to the practise of this invention that the improved method of producing the improved and coarser alumina trihydrate crystals from the alumina trihydrate precipitation step of any Bayer process, which process is operated to produce alumina trihydrate crystals from bauxite ores, include a method that comprises treating hot caustic pregnant Bayer process liquors after red mud separation and any final liquid-solid separation or other removal or polishing step designed to remove very small particle red mud materials, for example the use of specially designed filters to remove very finely suspended iron oxide particles from pregnant Bayer liquors prior to the precipitation step, and prior to or simultaneously with the seeding of these pregnant liquors.

However, it is feasible that, if filters are used prior to crystallization, a working and effective crystal modifying amount of dextrans could be supplied to the crystallizers by overdosing prior to filtration and allowing the amount of overdosed dextrans to pass through the filters to provide crystal modifying effects. This would be an alternative means of practising my invention, but is not a preferred means.

The preferred instant process involves the addition of effective crystal-modifying and crystal size increasing amounts of linear polysaccharides, preferably linear dextrans having a weight average molecular weight ranging between about 500,000 to about 40,000,000, most preferably between 5,000,000 to 40,000,000. The addition of our dextrans is preferred to be after red mud separation and final red mud residue removal steps, if any, but prior to or simultaneous with the addition of the alumina trihydrate seeds, or any other seeding materials, which seed crystals are used for the purpose of beginning the crystallization of alumina trihydrate from pregnant or green Bayer process liquors as these liquors are cooled. The normal process involves, after seeding, the cooling of the green or pregnant Bayer process liquors from temperatures of approximately 115° C., ±10° C., to temperatures of approximately 65° C., ±5° C. (or below, some processors go as low as 50° C.), and collecting the precipitated alumina trihydrates on precipitation trays. Although, as taught above, dextrans have been used to enhance the flocculation of alumina trihydrate precipitates, their previous use involved the addition after the seeding, cooling, and crystallization step and did not obtain crystal modification as in the instant process. Therefore, no effect on ultimate crystal size was observed by their use. I have discovered that by modifying the location and the amount of dextrans used in this crystallization step and, most preferably, by adding the dextrans to the hot pregnant liquors immediately before seeding or simultaneously with the addition of the seed, but after final filtration and removal of all red mud materials, I can effect, in a positive way, the crystal size and shape of the alumina trihydrate recovered from the Bayer process. The effective amount of these preferred dextrans used in the process described above, including that process which adds dextrans to hot caustic pregnant Bayer process liquors after the red mud separation step, but prior to or simultaneously with the seeding of the hot pregnant liquors, ranges between approximately 0.1 ppm to about 1000 ppm, and is preferably between about 0.5 ppm and about 500 ppm, and most preferably from 1 to about 100 ppm dextran based on a total weight of Bayer process liquor.

Having described my invention I claim:

1. An improved method of producing coarser aluminum trihydrate crystals, said crystals having a reduced content of crystallites having a crystal size below negative 325 mesh relative to crystals obtained in the absence of crystal modifying treatment, in the alumina trihydrate precipitation step of a Bayer process operating to produce alumina trihydrate crystals from bauxite ores, which method comprises treating caustic pregnant Bayer process liquor; after red mud separation, and prior to, or simultaneously with seeding the pregnant liquors; with an effective crystal modifying amount, ranging between about 0.1 ppm to about 1,000 ppm, based on the total weight of the caustic Bayer process liquors, of dextran having a weight average molecular weight ranging between about 50,000 to about 40,000,000 and having a degree of branching less than 5 weight percent of the total weight of the dextran.

2. The method of claim 1 wherein the dextran is added to the pregnant Bayer process liquor at a concentration raging between about 0.1 ppm to about 500 ppm, based on the total weight or liquor.

3. The method of claim 1 or claim 2 wherein the improved alumina trihydrate crystals recovered from the precipitation step have an average crystal size at least one percent higher than the crystal size obtained in the absence of dextran.

4. The method of claim 1 or claim 2 wherein the improved alumina trihydrate crystals are recovered from a humate contaminated green Bayer Process liquor.

5. The method of claim 1 wherein the dextran has a weight average molecular weight ranging between about 100,000 to about 35,000,000.

6. The method of claim 1 or 2 wherein the crystal modifying dextran has a weight average molecular weight ranging between 500,000 to about 25,000,000.

7. The method of claim 1 or 2 wherein the dextran as a weight average molecular weight ranging between about 100,000 to about 35,000,000 and further, wherein the dextran contains at least 95% of a $\alpha$ 1-6 linked Glucopyranose units.

8. The method of claim 1 wherein the dextrans are added to hot caustic pregnant Bayer process liquors immediately before seeding, or simultaneously with the addition of the seed, but after removal of all red mud materials.

9. The method of claim 8 wherein the dextrans are added simultaneously with seeding of the hot pregnant liquors at concentrations, based on total process liquor, ranging between about 0.1 parts per million to about 1,000 parts per million.

* * * * *